United States Patent
Echauz et al.

(10) Patent No.: US 11,551,137 B1
(45) Date of Patent: Jan. 10, 2023

(54) MACHINE LEARNING ADVERSARIAL CAMPAIGN MITIGATION ON A COMPUTING DEVICE

(71) Applicant: CA, Inc., San Jose, CA (US)

(72) Inventors: Javier Echauz, Alpharetta, GA (US); Andrew B. Gardner, Roswell, GA (US); John Keith Kenemer, Roswell, GA (US); Jasjeet Dhaliwal, Morgan Hill, CA (US); Saurabh Shintre, Sunnyvale, CA (US)

(73) Assignee: CA, Inc., San Jose, CA (US)

( * ) Notice: Subject to any disclaimer, the term of this patent is extended or adjusted under 35 U.S.C. 154(b) by 925 days.

(21) Appl. No.: 16/399,725

(22) Filed: Apr. 30, 2019

(51) Int. Cl.
| | |
|---|---|
| *G06F 21/00* | (2013.01) |
| *G06N 20/00* | (2019.01) |
| *G06F 21/56* | (2013.01) |
| *G06K 9/62* | (2022.01) |

(52) U.S. Cl.
CPC ............ *G06N 20/00* (2019.01); *G06F 21/56* (2013.01); *G06K 9/623* (2013.01); *G06K 9/6269* (2013.01)

(58) Field of Classification Search
CPC ........ G06N 20/00; G06F 21/56; G06K 9/623; G06K 9/6269
See application file for complete search history.

(56) References Cited

U.S. PATENT DOCUMENTS

| | | | | |
|---|---|---|---|---|
| 9,754,106 B2 * | 9/2017 | Roundy | ................ | G06F 21/554 |
| 10,764,313 B1 * | 9/2020 | Mushtaq | ................ | G06N 20/00 |
| 11,057,289 B2 * | 7/2021 | Ranjan | ................ | H04L 43/026 |
| 11,240,275 B1 * | 2/2022 | Vashisht | ................ | H04L 63/145 |
| 2013/0326625 A1 * | 12/2013 | Anderson | ............... | G06F 21/56 726/23 |
| 2016/0078365 A1 * | 3/2016 | Baumard | ............ | H04L 63/1425 706/12 |
| 2016/0134653 A1 * | 5/2016 | Vallone | ................ | H04L 41/046 726/25 |

(Continued)

OTHER PUBLICATIONS

Dube, Simant; "High Dimensional Spaces, Deep Learning and Adversarial Examples", rXiv:1801 00634; version 4; Jan. 14, 2018; 27 pages.

(Continued)

*Primary Examiner* — Don G Zhao
(74) *Attorney, Agent, or Firm* — Adsero IP (57) ABSTRACT

Machine learning adversarial campaign mitigation on a computing device. The method may include deploying an original machine learning model in a model environment associated with a client device; deploying a classification monitor in the model environment to monitor classification decision outputs in the machine learning model; detecting, by the classification monitor, a campaign of adversarial classification decision outputs in the machine learning model; applying a transformation function to the machine learning model in the model environment to transform the adversarial classification decision outputs to thwart the campaign of adversarial classification decision outputs; determining a malicious attack on the client device based in part on detecting the campaign of adversarial classification decision outputs; and implementing a security action to protect the computing device against the malicious attack.

20 Claims, 5 Drawing Sheets

(56) References Cited

U.S. PATENT DOCUMENTS

| | | | | |
|---|---|---|---|---|
| 2016/0253498 | A1* | 9/2016 | Valencia | G06N 20/00 |
| | | | | 726/23 |
| 2016/0337390 | A1* | 11/2016 | Sridhara | G06N 20/00 |
| 2018/0196942 | A1* | 7/2018 | Kashyap | G06F 21/561 |
| 2018/0367547 | A1* | 12/2018 | Jang | G06F 21/552 |
| 2019/0050564 | A1* | 2/2019 | Pogorelik | G06N 3/0472 |
| 2019/0164159 | A1* | 5/2019 | Ponniah | G06Q 20/405 |
| 2019/0207967 | A1* | 7/2019 | Vashisht | H04L 63/20 |
| 2019/0332769 | A1* | 10/2019 | Fralick | G06F 21/554 |
| 2020/0177608 | A1* | 6/2020 | Okunlola | H04L 63/1425 |
| 2020/0304524 | A1* | 9/2020 | Weinberger | H04L 63/104 |

OTHER PUBLICATIONS deeplearningbook.org; "Chapter 7. Regularization for Deep Learning"; website; located at: https://www.deeplearningbook.org/contents/regularization.html; Jun. 4, 2018; 47 pages.

Meinshausen, Nicolai; "Quantile Regression Forests"; Journal of Machine Learning Research 7; Jun. 2006; 17 pages.

Feinman et al.; "Detecting Adversarial Samples from Artifacts"; arXiv:1703.00410; version 3; Nov. 15, 2017; 9 pages.

Carlini, N. et al.; "Towards Evaluating the Robustness of Neural Networks"; arXiv:1608.04644; version 2; Mar. 22, 2017; 19 pages.

Dhaliwal, J.; "Gradient Similarity: An Explainable Approach to Detect Adversarial Attacks against Deep Learning"; arXiv:1806 10707; presented at CCS' 18, Nov. 2018, Toronto, Canada; 11 pages.

Goodfellow, I. et al.; "Explaining and Harnessing Adversarial Examples"; arXiv:1412.6572; version 3; Mar. 20, 2015; 11 pages.

Wiecki, Thomas; "Variational Inference: Bayesian Neural Networks"; PyMC3 3.6 documentation; Mar. 2017; located at: https://docs.pymc.io/notebooks/bayesian_neural_network_advi.html; 11 pages.

Gal et al.; "Dropout as a Bayesian Approximation: Insights and Applications"; white paper; University of Cambridge; 2015; 10 pages.

* cited by examiner

MACHINE LEARNING ADVERSARIAL CAMPAIGN MITIGATION ON A COMPUTING DEVICE

BACKGROUND

Machine learning models ("models") are increasingly used to make probabilistic determinations, and models are becoming increasingly common in automation technologies and in cybersecurity. These models, however, are vulnerable to multiple types of malicious attacks, including adversarial inputs which may lead to otherwise absurd seeming errors. The misclassification of outputs that result from adversarial inputs can result in significant problems for the model's applicability. Practical and low-cost adversarial mitigation is therefore needed.

The subject matter claimed herein is not limited to embodiments that solve any disadvantages or that operate only in environments such as those described above; rather, this background is only provided to illustrate one example technology area where some embodiments described herein may be practiced.

SUMMARY

In some embodiments, a computer-implemented method for machine learning adversarial campaign mitigation on a computing device may be performed by the same or another computing device, the computing device including one or more processors. The method may include deploying an original machine learning model in a model environment associated with the computing device; deploying a classification monitor in the model environment to monitor classification decision outputs in the machine learning model; detecting, by the classification monitor, a campaign of adversarial classification decision outputs in the machine learning model; applying a transformation function to the machine learning model in the model environment to transform the adversarial classification decision outputs to thwart the campaign of adversarial classification decision outputs; determining a malicious attack on the computing device based in part on detecting the campaign of adversarial classification decision outputs; and implementing a security action to protect the computing device against the malicious attack.

In some embodiments, deploying of the original machine learning model may further include deploying a binary classifier.

In some embodiment, the method may further include determining a cessation of the campaign of adversarial classification decision outputs; and restoring the original machine learning model in the model environment after the cessation.

In some embodiment, deploying of the classification monitor in the model environment may further include deploying the classification monitor in a threat environment where greater than 95% of the classification decisions outputs have an equal to or less than 0.1% false positive rate.

In some embodiments, the monitoring of the classification decision outputs may further include monitoring a scalar score. In some embodiments, the monitoring of the classification outputs may further including determining that each of the classification decision outputs is either malicious or benign.

In some embodiments, the detecting of the campaign of adversarial classification decision outputs may further include detecting a plurality of adversarial inputs during runtime on the computing device that are intended to misclassify the classification decision outputs.

In some embodiments, the method may further include evaluating a performance level of the original machine learning model by analyzing a receiver operating characteristics (ROC) curve.

In some embodiments, the method may further include setting an ROC threshold, the threshold associated with a pre-determined point on the ROC curve; deriving a binary difficulty detector from a distribution of naturally-occurring difficult samples; sampling from the distribution at different proportions of binary ground-truth labels; proactively computing a low-bandwidth equiprobable posterior function from the sampling based on detecting the plurality of adversarial inputs during runtime; and deploying the low-bandwidth equiprobable posterior function based on each of a plurality of adversarial environments.

In some embodiments, the method may further include detecting a pinch-down on the ROC curve; and applying the transformation function in the model environment to transform the adversarial classification decision outputs based on detecting the pinch-down on the ROC curve.

In some embodiments, the applying of the transformation function in the model environment may further include deriving a low band-width equiprobable posterior function.

In some embodiments, the applying of the transformation function in the model environment may further include determining a set of classification decision outputs that satisfy a pre-determined plurality of scalar score intervals.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

In some embodiments, machine learning models ("models") may be used as binary classifiers, where a binary classifier classifies the elements of a given set of inputs into two groups and predicts into which group each input belongs on the basis of a pre-determined classification rule or threshold. In some embodiments, models employed for binary classification may include decision trees, random forests, Bayesian networks, neural networks, support vector machines, logistic regression, etc. In one embodiment, the systems and methods described herein may enable a defense of a binary classifier if and when the classifier is subjected to a toxic and adversarial environment. In one embodiment, the binary classifier may operate as a malware detector, and the adversarial environment may be a threat landscape deliberately manipulated to induce higher-than-ordinary error rates. For example, in malware detection the binary classifier may determine a classification of benign-versus-malicious.

Models are typically trained with data sets input at the backend and deployed on an endpoint at a client device. Frequently, models may be used to solve security issues such as spam detection, authentication, identifying fraudulent accounts, intrusion detection, general malware detection, etc., and are thus vulnerable to malicious attacks in a variety of different ways. Each model may contain information about inputs, outputs, and classification algorithms. In a black box, an attacker may only be aware of classifications such as "0-vs-1" or "malicious-vs-benign." Thus, in some embodiments, adversarial attacks may include "poisoning" attacks to manipulate a data set before or during the training of the model on the backend In a poisoning attack, an attacker may thus provide input samples that shift a model decision boundary, such that the inputs are classified in the attacker's favor.

In an additional or alternative embodiment, attackers may use adversarial inputs at run time to provide inaccurate results, thus making the model ineffective at the endpoint. In these attacks, the model may have been developed and trained on a dataset, and when the model is deployed in the environment, the attacker may cause the model to classify the input incorrectly (e.g., making a malicious file appear benign). Although the embodiments are described in terms of negative-versus-positive, malicious-versus-benign, etc., any type of binary classification may be determined and is not limited to the examples described.

Current attack detectors may negatively affect the performance of the model because current detectors may be optimized for an object function and may make optimization decisions one-by-one. In some solutions, a method may be used to harden the model before the model is deployed. In hardening the model, the model may be created and then input with any and all inputs that could be considered adversarial (e.g., where the model is being forced to output the wrong classification). In another embodiment, a solution may include testing adversarial inputs at runtime with the hope of determining anomalies that may show themselves at a later time. Thus, prior solutions may focus on "one-offs" or case-by-case bases for input instances, which may lead to a suboptimal solution. In contrast, the systems and methods described herein may focus on adversarial attack campaigns, instead of one-offs, where an adversarial attack campaign involves multiple attacks over a period of time, and for which adversarial attack campaigns may be determined with respect to a predetermined statistical threshold, such that the attack may be determined, analyzed, and/or measured using receiver operating characteristic curves ("ROC" curves).

In some embodiments, adversarial attack campaigns may be determined by measuring the performance of the model, in some embodiments, and an ROC curve may be created and used to evaluate the performance of the binary classifier. In one embodiment, the ROC curve may be created by plotting the true positive rate (TPR) against the false positive rate (FPR) at various threshold settings. The TPR may also be known as the "sensitivity" or "probability of detection," and may reflect correctly assigned positive classifications. The FPR may be known as the "probability of false alarm," and may reflect incorrectly assigned positive classifications.

In one embodiment, benign-versus-malicious class conditionals of output decision scores may be telemetrically monitored on a backend, where histograms are smoothly kernel-estimated. In an additional or alternative embodiment, telemetric monitoring of the output decisions scores may result in determinations that: (1) an unqualified use of an adversarial detector inverts the expected ROC curve; (2) an adversarial attack campaign pinches down the ROC curve; and (3) the ROC curve can be repaired to a minimally degraded state during the campaign using an automatically applied mathematical transformation function.

In some embodiments, adversarial attack campaign detection may be considered a subset of "difficulty" detection, where a focus is placed on a scalar decision score output space in which model-processed adversarial samples are eventually output. Thus, the methods and systems described herein may take into consideration adversarial attack campaigns as a whole as opposed to one-off adversarial inputs and may prescribe an inexpensive domain adaptation leading to a mitigated repair of an attacked model's ROC. Furthermore, the systems and methods described herein may enable preemptive simulation of various adversarial attack campaign scenarios by sampling from the model's own difficulty detection.

In one embodiment, detecting an adversarial attack campaign may occur on the backend by observing the "pinch down" on the ROC curve, or by observing a KDE-smoothed class-conditional distribution of a decision score having two or more crossover points over the model decision boundary.

In an alternative or additional embodiment, an adversarial attack campaign may be detected at the endpoint (e.g., on a client device or other computing device), by determining that decision scores are falling within an interval near to the model decision boundary at higher-than-historical rates over a certain period of time For example, if the last 10,000 consecutive detections all had uncertain decision scores (i.e., scores near the model decision boundary), adversarial manipulation may be assumed, as it would be otherwise rare to see such a large number of uncertain decision scores in a regular environment.

Figure 1:
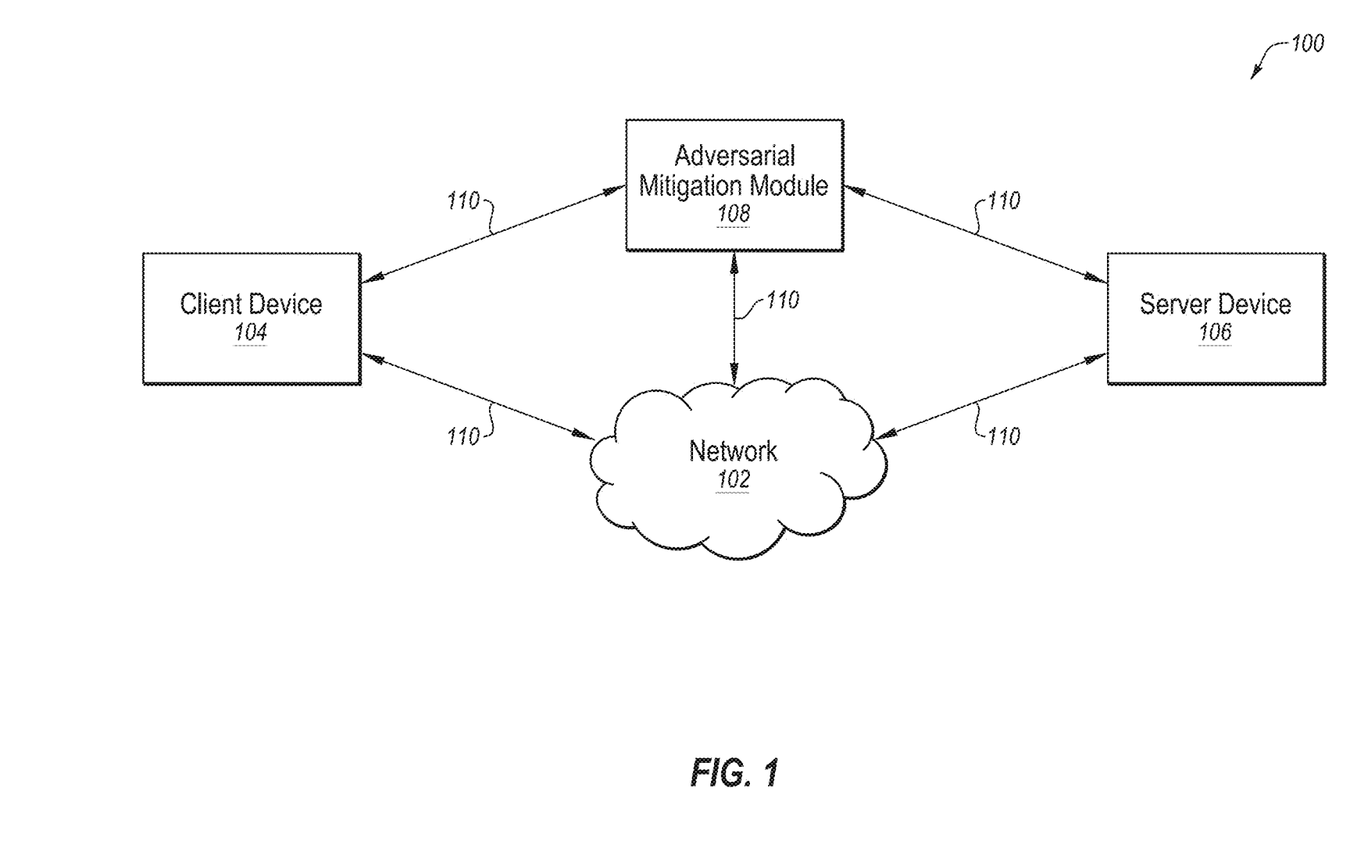
FIG. 1 illustrates an example system configured for machine learning adversarial campaign mitigation on a computing device.

Turning to the figures, FIG. 1 illustrates an example system configured for machine learning adversarial campaign mitigation on a computing device. The system 100 may include a network 102, a client device 104, a server device 106, and an adversarial mitigation module 108. In some embodiments, the adversarial mitigation module 108 may execute on a standalone device that communicates with the client device 104 and the server device 106. In other embodiments, however, the adversarial mitigation module 108 may be part of the client device 104 and/or the server device 106.

In some embodiments, the network 102 may be configured to communicatively couple the client device 104, the server device 106, and the adversarial mitigation module 108 by way of communication links 110. Although not specifically shown in FIG. 1, the client device 104 may directly communicate with the server device 106 by way of the communication links 110. In some embodiments, the network 102 may be any wired or wireless network, or combination of multiple networks, configured to send and receive communications between systems and devices. In some embodiments, the network 102 may include a Personal Area Network (PAN), a Local Area Network (LAN), a Metropolitan Area Network (MAN), a Wide Area Network (WAN), a Storage Area Network (SAN), the Internet, or some combination thereof. In some embodiments, the network 102 may also be coupled to, or may include, portions of a telecommunications network, including telephone lines, for sending data in a variety of different communication protocols, such as a cellular network or a Voice over IP (VoIP) network.

Figure 5:
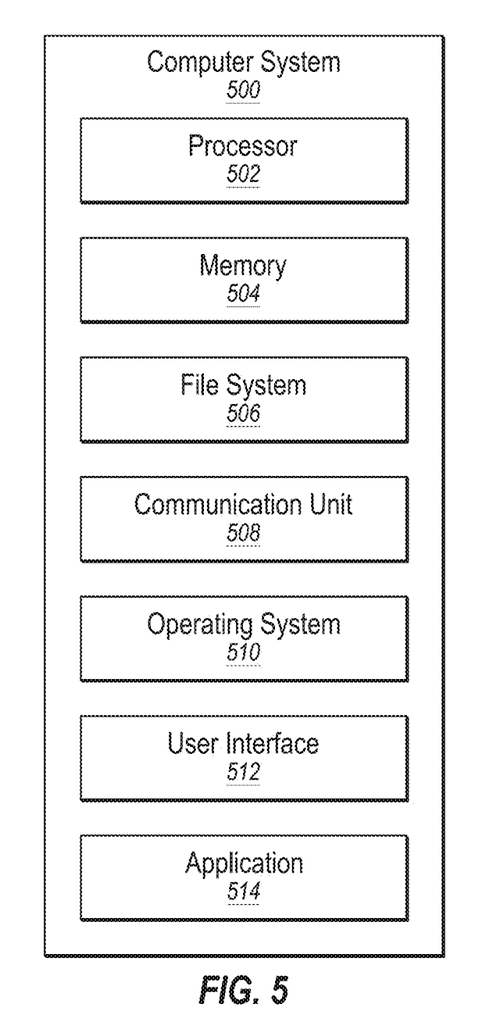
FIG. 5 illustrates an example computer system that may be employed in machine learning adversarial campaign mitigation on a computing device.

In some embodiments, the client device 104 may be any computer system capable of communicating over the network 102 and capable of at least mitigating a machine learning adversarial attack campaign, examples of which are disclosed herein in connection with the computer system 500 of FIG. 5. Similarly, in some embodiments, the server device 106 may be any computer system capable of communicating over the network 102 and capable of mitigating an adversarial attack campaign, examples of which are disclosed herein in connection with the computer system 500 of FIG. 5.

Modifications, additions, or omissions may be made to the system 100 without departing from the scope of the present disclosure. For example, in some embodiments, the system 100 may include additional components similar to the components illustrated in FIG. 1 that each may be configured similarly to the components illustrated in FIG. 1. Also, the adversarial mitigation module 108 may execute on the client device 104, the server device 106, or may execute on another device not illustrated in FIG. 1.

Figure 2:
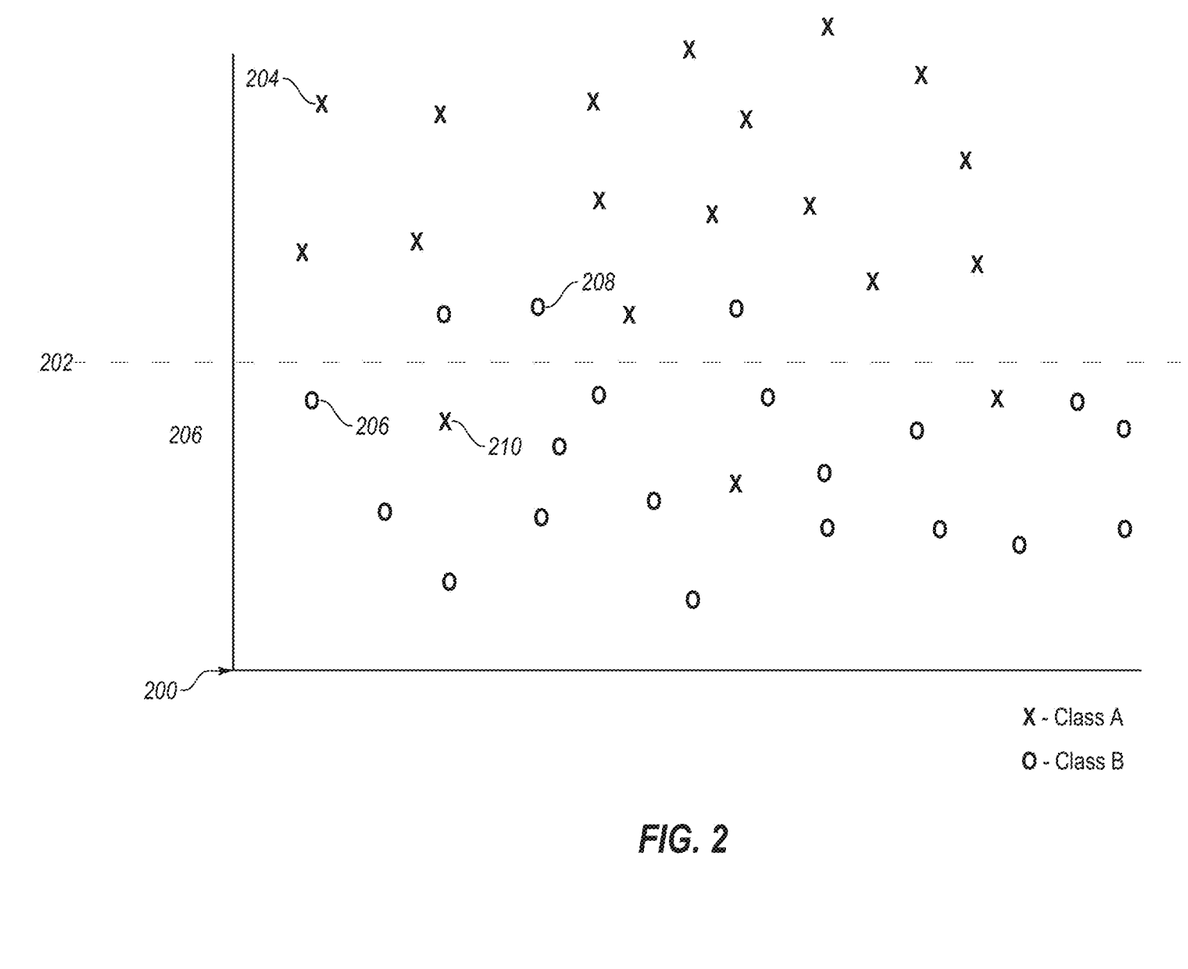
FIG. 2 illustrates an example graph related to machine learning adversarial campaign mitigation on a computing device.

FIG. 2 illustrates an example graph 200 related to machine learning adversarial campaign mitigation on a computing device. In one embodiment, a machine learning model may receive at least one data set of inputs in order to train the model to determine which class from a finite set of pre-determined classes the inputs should be classified. In the case of a binary classifier, the finite set of classes is two classes. In some embodiments, for example, the classes may be "malicious" and "benign."

Each input may be provided to the model as a vector of features that describes the input (e.g., a keyword, a value, etc.), and the model may use the set of features to determine the output classification. In the context of classification, an adversarial input, however, may be created to force the model to classify the input in a class different from the input's appropriate class.

Each of the labels (e.g., malicious, benign) assigned during training may be considered as the "ground truth" in constructing the model to be used at runtime. Thus, as the model continues to train, an iterative refinement process may strengthen or weaken the classification association as additional supporting data is continuously identified. Generally, the larger the training data set and the more diverse the training data set, the more accurate the model. Unless the training dataset contains all possible input feature vectors, however, the model cannot fully capture a complete model of the intended target environment.

In one embodiment, detecting an adversarial attack campaign may be part of a larger concept of "difficulty detection," where the "difficulty" is any input sample that makes the model output the wrong answer. However, simply because an input sample is "difficult" does not necessarily mean the input sample is adversarial or malicious. The difficult input samples may be samples that are misclassified and that cause confusion for the model, whereas adversarial misclassified inputs may be considered forced errors.

In some embodiments, the model may have a high dimensional input and may rely on a low-dimensional output to make a decision. In other words, the input dataset may include many instances of data beyond the binary classification into which the data is classified, and at the end point, the data may be either a hard-limited 0 or 1 (malicious or benign), or soft value between 0 and 1 (probability estimate), or continuous score between $-\infty$ and $\infty$, etc. Thus, the adversarial mitigation module 108 may collect statistics about a scalar output (e.g., if the score is high, the output is malicious; if the score is low, the output is benign) in determining whether there is an adversarial attack campaign occurring.

In one embodiment, the graph 200 may show a set of examples inputs displayed as "x" and "o" marks. For example, example inputs 204 and 210 may be represented by "x" marks, where "x" inputs may be determined by be part of a pre-determined class A. In another example, example inputs 205 and 208 may be represented by "o" marks, where "o" inputs may be determined to be part of a pre-determined class B. For each sample input, each input may represent an input feature value uniquely identified to the specific input's location in the plane shown by the graph 200, where the two classes of inputs, A and B are shown roughly separated by a boundary 202. The boundary 202 may be considered the "model decisions boundary."

In the example graph 200, therefore, the model has been provided with input data set, and it has been determined that the input samples should be distributed as shown around the model decision boundary 202 based on a pre-determined classification threshold. As previously described, each class shown in FIG. 2 may represent a "ground truth," where the "o" inputs may represent, for example, clean or benign files, and the "x" inputs may represent, for example, malicious files.

With an ideal model, each of the inputs would be correctly classified by the model into class A and class B; however, in a regular model, the model is unlikely to be able to perfectly determine which input belongs to which class, and thus must make an estimation. The estimation may inherently be subject to some errors. For example, in the graph 200, the example input 208, which would appear to be part of class B has actually been classified as class A. Similarly, the example input 210 appears to be part of class A, but should actually be classified as class B. In one embodiment, when the model classifies each input, the model may use Bayes-optimal decision rules to classify each input by determining the least probability of misclassification in a specific environment. This classification output may result in the low-dimensional scalar output.

Unless the classes are perfectly separable based on, for example, input features, label noise, statistical relationships with other inputs, etc., each model may experience a "difficulty" when any input is misclassified or when there is an error. These errors may be considered "unforced" errors or "natural" errors, as they may be inherent in the nature of a model which is unlikely to be perfect. Despite these errors, the model decisions boundary is likely to be determined to be the best minimal error classifier. Difficulty related to natural errors is also known as "confusion" in the art.

In another embodiment, however, an attacker may attack a model by forcing errors through the use of adversarial inputs. The adversarial inputs, rather than occurring at the training stage, may be injected into the model at runtime, forcing the model to misclassify the inputs into incorrect classes. In some embodiments, "difficult" inputs tend to concentrate among the model decisions boundary, and thus, forced adversarial inputs are likely to be concentrated along the model decisions boundary as well. For example, in the graph 200, the difficult inputs may be the example inputs 208 and 210, which are near to the model decisions boundary 202. In contrast "easy" inputs which are usually correctly classified, are distributed farther from the decision crossover point (i.e., farther from the model decisions boundary).

In a toxic or adversarial environment, however, it may be difficult for the model to determine which of the "difficult" inputs is purposefully misclassified. If a difficulty detector monitors for a single input that has been erroneously classified, the detector may not efficiently determine that the model is under attack versus simply having a natural unforced error. Furthermore, determining whether the inputs are adversarial inputs individually may result in significant costs in processing efforts, time, and money.

Thus, before an adversarial attack campaign is detected, the adversarial mitigation module 108 (e.g., detector) of FIG. 1 may be deployed in the intended environment where errors are unexpected and rare. The adversarial mitigation module 108 may then telemetrically monitor conditional likelihoods on the backend (e.g., 0-vs.1) to produce an expected ROC curve showing the rates of hits and false alarms, which can be related to probability of correct classification if given class priors. The adversarial mitigation module 108 may then determine that an attack is occurring, and analyze a campaign of adversarial inputs, where an abnormal proportion of adversarial inputs in the environment seen by the model is indicative of an adversarial attack campaign.

Figure 3A:
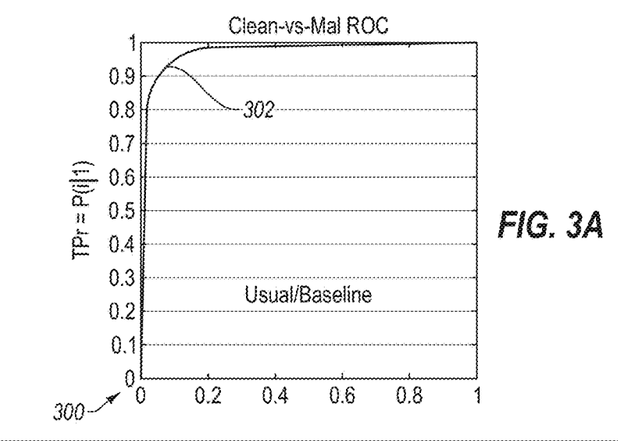
FIGS. 3A-3C illustrate example graphs related to machine learning adversarial campaign mitigation on a computing device.

FIG. 3A illustrates an example graph 300 related to machine learning adversarial campaign mitigation on a computing device. In one embodiment, an expected, normal ROC curve may display as a random change model as shown by an ROC curve 302 of FIG. 3A. A model which produces good results, or inputs that are classified correctly and as expected, may show as the ROC curve 302 having upwards elbow as the TPR increases over the FPR. In an ideal embodiment, the ROC curve 302 may align as closely to the upper-left corner as possible. In one embodiment, the expected ROC curve 302 may demonstrate a tradeoff between accurately detecting, for example, a malicious file, versus how many times the classification is naturally incorrect (as opposed to a forced error). Thus, in an ideal ROC curve, the tradeoff between the TPR and the FPR shows that an optimal amount of inputs are categorized correctly.

Figure 3B:
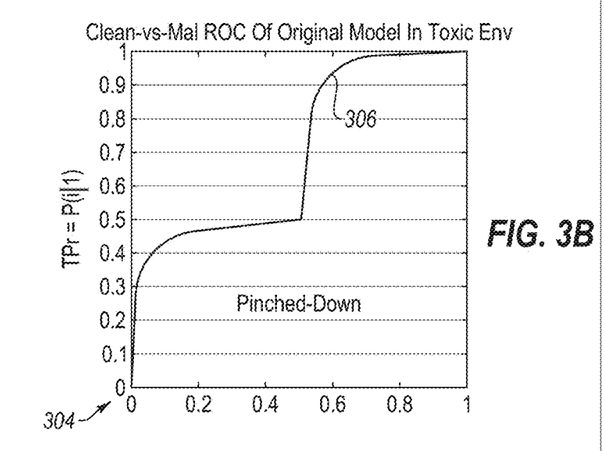

FIG. 3B illustrates an example graph 304 related to machine learning adversarial campaign mitigation on a computing device. The graph 304 may show the output of the model at some point during an adversarial attack campaign. During an adversarial attack campaign, the ROC curve 306 may display a "pinch down," where the pinched down curve may be indicative of a detector determining that inputs are misclassified or have been reclassified due to the adversarial attack campaign in a now-toxic environment. More specifically, evidence of the "pinch down" occurs when the original classification detector designed for use in the intended environment is being deployed in the now-toxic environment created by the adversarial attack campaign.

In order to mitigate the attack and "unpinch" the ROC curve to a more desirable shape (e.g., as close to the ROC curve 302 from FIG. 3A as possible), an equiprobable class-posterior transformation function may be derived and transmitted to the model at the endpoint to be used as a post-transformation of the original decision scalar scores. In one embodiment, the equiprobable class-posterior transformation function enables a preemptive simulation and proactively reacts to detecting an adversarial attack campaign. The transformation function may precompute the optimal response to each of several plausible adversarial attack scenarios, by way of a simulation, and then stores the response information as a look-up table. In one embodiment, from the look-up table, the adversarial mitigation module 108 may efficiently deploy the correct mitigation solutions during a real-world adversarial attack campaign.

In one embodiment, by applying the transformation function, the adversarial mitigation module 108 may automatically reverse the misclassifications made by way of the adversarial attack, and thus mitigate the harm inflicted by the campaign by reversing the decisions falsely determined by the model within score intervals where it is advantageous to do so. The mitigation function may be a low bandwidth transmission such that the cost efficiency of the model is not significantly impacted.

In one embodiment, the transformation function may be provided as:

$$\text{Posterior(score)} = \frac{pdf_1(\text{score})}{pdf_0(\text{score}) + pdf_1(\text{score})}$$

where $pdf_0$(score) represents the clean-conditional distribution of scalar scores under an adversarial campaign, and where $pdf_1$(score) represents the malicious-conditional distribution. A threshold may be applied to the output of the transformation function to determine or obtain a desired mitigated operating point. The algorithm used to obtain the mitigated ROC may be, in one example, a Monte Carlo estimate, where the decision scores are sent through the deployed transformation function, and by subsequently plotting the empirical ROC curve.

By applying the transformation function at the endpoint and on a campaign basis, as opposed to applying a classification modifier on one-off decisions, the model may not be forced to reverse decisions that were already optimal, which would result in creating even more incorrect classifications on average. In contrast, the transformation function may provide an additional layer to the model that reverses only those classifications which are profitable when the output scalar score is determined to be within one or more specific intervals. After the transformation function has been applied, and the adversarial attack campaign has subsided, the model may be returned to its original state to make decisions.

Figure 3C:
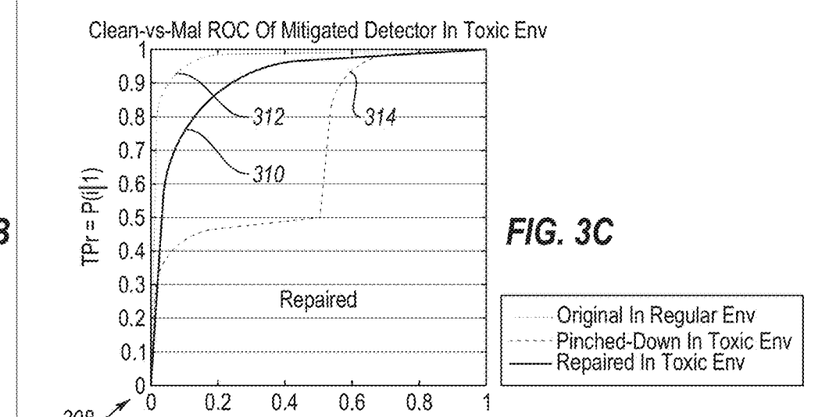

FIG. 3C shows an example graph 308, in which dotted lines 312 and 314 show the optimal ROC curve 302 and the pinched-down adversarial ROC curve 314, respectively. The example graph 308 shows a repaired ROC curve 310 after the transformation function has been applied, in which the ROC curve appears much closer to the optimal original ROC curve 302.

Figure 4:
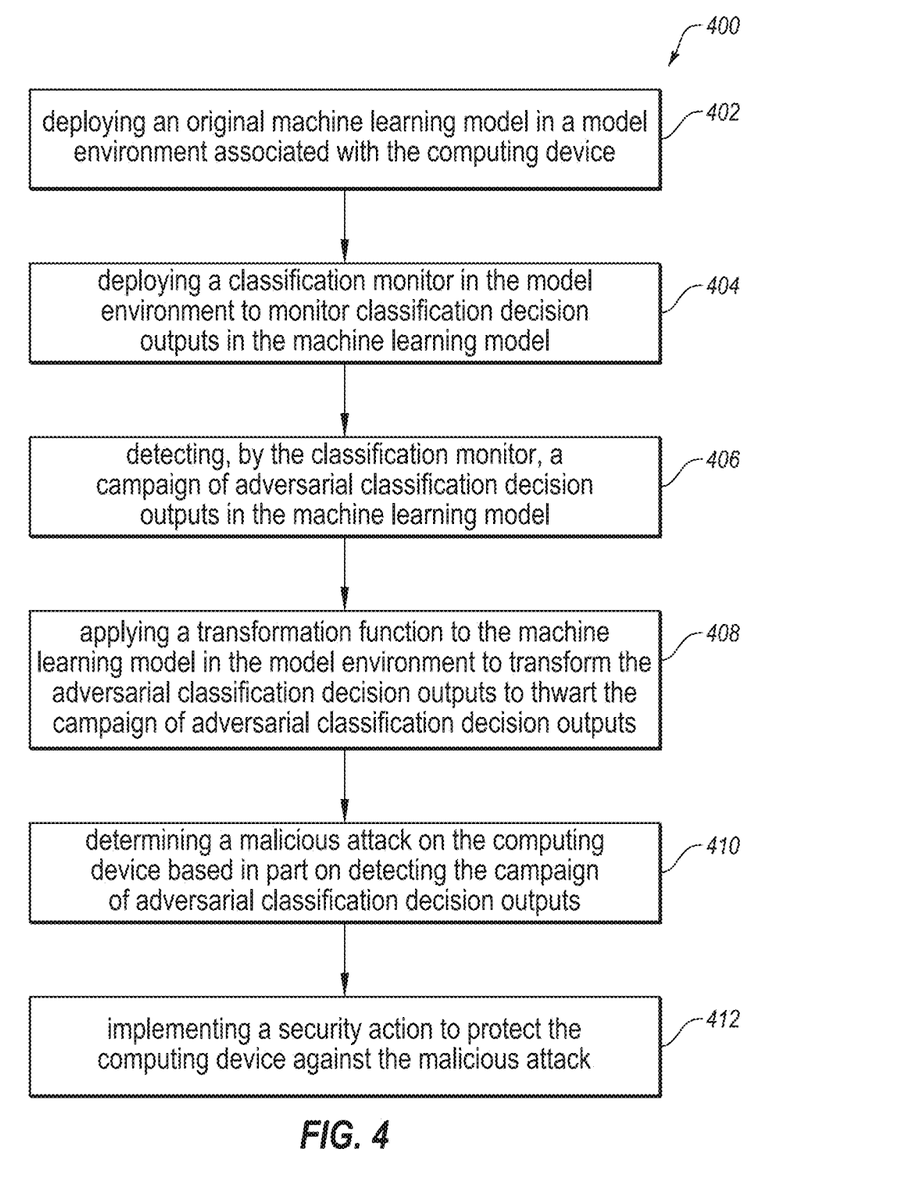
FIG. 4 illustrates a flowchart of an example method for machine learning adversarial campaign mitigation on a computing device.

FIG. 4 is flowchart of an example method 400 for machine learning adversarial campaign mitigation on a computing device. The method 400 may be performed, in some embodiments, by a device, module, and/or system, such as by the client device 104, the server device 106 and/or the adversarial mitigation module 108 executing on one of these devices or on another device. In these and other embodiments, the method 400 may be performed by one or more processors based on one or more computer-readable instructions stored on one or more non-transitory computer-readable media. The method 400 will now be described in connection with FIGS. 1, 2, and 3A-3C.

The method 400 may include, at action 402, deploying an original machine learning model in a model environment associated with the computing device. For example, the adversarial mitigation module 108 may deploy a previously trained machine learning model in an environment intended to apply binary classifications to high-dimensional inputs.

The method 400 may include, at action 404, deploying a classification monitor in the model environment to monitor classification decision outputs in the machine learning model. For example, the adversarial mitigation module 108 may be deployed at the end user to monitor the binary classification of inputs during runtime. In another embodiment, the classification monitor may be deployed in an environment where greater than 95% of the classification decisions outputs have an equal to or less than 0.1% false positive rate.

The method 400 may include, at action 406, by the classification monitor, a campaign of adversarial classification decision outputs in the machine learning model. For example, the adversarial mitigation module 108 may determine, on the backend, a pinch down on the ROC curve and/or that decision scores are occurring near the decision boundary at higher than expected and/or historical rates.

The method 400 may include, at action 408, applying a transformation function to the machine learning model in the model environment to transform the adversarial classification decision outputs to thwart the campaign of adversarial classification decision outputs. For example, the adversarial mitigation module 108 may derive and apply a low-bandwidth equiprobable posterior function that reverses classification decisions outputs determined to be adversarially switched.

The method 400 may include, at action 410, determining a malicious attack on the computing device based in part on detecting the campaign of adversarial classification decision outputs. For example, the adversarial mitigation module 108 may determine that the adversarial attack campaign is a malicious attack on the client device 104 or on network 102, including indications of adversarially forced outputs, difficult outputs and/or natural unforced errors.

The method 400 may include, at action 412, implementing a security action to protect the computing device against the malicious attack. For example, the adversarial mitigation module 108 may automatically implement a security action that includes quarantining the client device 104, blocking network communications between the client device 104 and other computing devices, sending an alert to an administrator, etc.

Although the actions of the method 400 are illustrated in FIG. 4 as discrete actions, various actions may be divided into additional actions, combined into fewer actions, reordered, expanded, or eliminated, depending on the desired implementation.

The systems and methods described herein may provide a plurality of benefits and technological improvements, and may result in the practical application of quickly and cheaply detecting an adversarial machine learning campaign, which may result in mitigating misclassified outputs which would render the model inefficacious. Further, it is understood that the method 400 may improve the functioning of a computer system itself. For example, the functioning of the client device 104 and/or the server device 106 may be improved by providing a low-cost, low-bandwidth solution to preventing adversarial inputs from rendering a machine learning model inoperable or useless. Also, the method 400 may improve the technological field of personal and business privacy and security by targeting a specific type of attack, and stopping the attack before the attack occurs or preventing the attack from causing further damage. A security action may be implemented automatically, without input from a human administrator, to mitigate, eliminate, or otherwise stop a malicious attack. For example, a security action may include quarantining a machine, software, or a process; blacklisting a file or a function; blocking network connectivity, etc.

FIG. 5 illustrates an example computer system that may be employed machine learning adversarial campaign mitigation on a computing device. In some embodiments, the computer system 500 may be part of any of the systems or devices described in this disclosure. For example, the computer system 500 may be part of any of the client device 104, the server device 106, and/or the adversarial mitigation module 108 of FIG. 1.

The computer system 500 may include a processor 502, a memory 504, a file system 506, a communication unit 508, an operating system 510, a user interface 512, and a module 514, which all may be communicatively coupled. In some embodiments, the computer system may be, for example, a desktop computer, a client computer, a server computer, a mobile phone, a laptop computer, a smartphone, a smartwatch, a tablet computer, a portable music player, a networking device, or any other computer system.

Generally, the processor 502 may include any suitable special-purpose or general-purpose computer, computing entity, or processing device including various computer hardware or software modules and may be configured to execute instructions stored on any applicable computer-readable storage media. For example, the processor 502 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 502 may interpret and/or execute program instructions and/or process data stored in the memory 504 and/or the file system 506. In some embodiments, the processor 502 may fetch program instructions from the file system 506 and load the program instructions into the memory 504. After the program instructions are loaded into the memory 504, the processor 502 may execute the program instructions. In some embodiments, the instructions may include the processor 502 performing one or more of the actions of the method 400 of FIG. 4.

The memory 504 and the file system 506 may include computer-readable storage media for carrying or having stored thereon computer-executable instructions or data structures. Such computer-readable storage media may be any available non-transitory media that may be accessed by a general-purpose or special-purpose computer, such as the processor 502. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 502 to perform a certain operation or group of operations, such as one or more of the actions of the method 400 of FIG. 4. These computer-executable instructions may be included, for example, in the operating system 510, in one or more modules, such as the adversarial mitigation module 108 of FIG. 1, or in some combination thereof.

The communication unit 508 may include any component, device, system, or combination thereof configured to transmit or receive information over a network, such as the network 102 of FIG. 1. In some embodiments, the communication unit 508 may communicate with other devices at other locations, the same location, or even other components within the same system. For example, the communication unit 508 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 508 may permit data to be exchanged with a network and/or any other devices or systems, such as those described in the present disclosure.

The operating system 510 may be configured to manage hardware and software resources of the computer system 500 and configured to provide common services for the computer system 500.

The user interface 512 may include any device configured to allow a user to interface with the computer system 500. For example, the user interface 512 may include a display, such as an LCD, LED, or other display, that is configured to present video, text, application user interfaces, and other data as directed by the processor 502. The user interface 512 may further include a mouse, a track pad, a keyboard, a touchscreen, volume controls, other buttons, a speaker, a microphone, a camera, any peripheral device, or other input or output device. The user interface 512 may receive input from a user and provide the input to the processor 502. Similarly, the user interface 512 may present output to a user.

The module 514 may be one or more computer-readable instructions stored on one or more non-transitory computer-readable media, such as the memory 504 or the file system 506, that, when executed by the processor 502, is configured to perform one or more of the actions of the method 400 of FIG. 4. In some embodiments, the module 514 may be part of the operating system 510 or may be part of an application of the computer system 500, or may be some combination thereof. In some embodiments, the module 514 may function as the adversarial mitigation module 108 of FIG. 1.

Modifications, additions, or omissions may be made to the computer system 500 without departing from the scope of the present disclosure. For example, although each is illustrated as a single component in FIG. 5, any of the components 502-514 of the computer system 500 may include multiple similar components that function collectively and are communicatively coupled. Further, although illustrated as a single computer system, it is understood that the computer system 500 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 502 of FIG. 5) including various computer hardware or software modules, as discussed in greater detail below. Further, as indicated above, embodiments described herein may be implemented using computer-readable media (e.g., the memory 504 or file system 506 of FIG. 5) for carrying or having computer-executable instructions or data structures stored thereon.

In some embodiments, the different components and modules described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, is described with reference to specific embodiments; however, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed, and various embodiments with various modifications as may be suited to the particular use contemplated.

The invention claimed is:

1. A computer-implemented method for mitigation of machine learning adversarial campaigns on a computing device, at least a portion of the method being performed by the computing device comprising one or more processors, the method comprising:
    deploying a machine learning model in a model environment associated with the computing device;
    deploying a classification monitor in the model environment to monitor classification decision outputs in the machine learning model, wherein the deploying of the classification monitor in the model environment comprises deploying the classification monitor in a threat environment where greater than 95% of the classification decision outputs have an equal to or less than 0.1% false positive rate;
    detecting, by the classification monitor, a campaign of adversarial classification decision outputs in the machine learning model;
    applying a transformation function to the machine learning model in the model environment to transform the adversarial classification decision outputs to thwart the campaign of adversarial classification decision outputs;
    determining a malicious attack on the computing device based in part on detecting the campaign of adversarial classification decision outputs; and
    implementing a security action to protect the computing device against the malicious attack.

2. The method of claim 1, wherein the deploying of the machine learning model further comprises:
    deploying a binary classifier.

3. The method of claim 1, further comprising:
    determining a cessation of the campaign of adversarial classification decision outputs;
        and restoring the machine learning model in the model environment after the cessation.

4. The method of claim 1, wherein the monitoring of the classification decision outputs further comprises monitoring a scalar score.

5. The method of claim 1, wherein the monitoring of the classification decision outputs further comprises:
    determining that each of the classification decision outputs is either malicious or benign.

6. The method of claim 1, wherein the detecting of the campaign of adversarial classification decision outputs further comprises:
    detecting a plurality of adversarial inputs during runtime on the computing device that are intended to misclassify the classification decision outputs.

7. The method of claim 6, further comprising:
    evaluating a performance level of the machine learning model by analyzing a receiver operating characteristics (ROC) curve.

8. The method of claim 7, further comprising:
    setting an ROC threshold, the threshold associated with a pre-determined point on the ROC curve;
    deriving a binary difficulty detector from a distribution of naturally-occurring difficult samples;
    sampling from the distribution at different proportions of binary ground-truth labels;
    proactively computing a low-bandwidth equiprobable posterior function from the sampling based on detecting the plurality of adversarial inputs during runtime; and
    deploying the low-bandwidth equiprobable posterior function based on each of a plurality of adversarial environments.

9. The method of claim 7, further comprising:
    detecting a pinch-down on the ROC curve; and
    applying the transformation function in the model environment to transform the adversarial classification decision outputs based on detecting the pinch-down on the ROC curve.

10. The method of claim 1, wherein the applying of the transformation function in the model environment further comprises:
    deriving a low-bandwidth equiprobable posterior function.

11. The method of claim 1, wherein the applying of the transformation function in the model environment further comprises:
    determining a set of classification decision outputs that satisfy a pre-determined plurality of scalar score intervals.

12. A system for machine learning adversarial campaign mitigation on a computing device, comprising:
    a processor;
    a memory in electronic communication with the processor; and
    instructions stored in the memory, the instructions being executable by the processor to:
        deploy a machine learning model in a model environment associated with the computing device;
        deploy a classification monitor in the model environment to monitor classification decision outputs in the machine learning model, wherein the deploying of the classification monitor in the model environment comprises deploying the classification monitor in a threat environment where greater than 95% of the classification decision outputs have an equal to or less than 0.1% false positive rate
        detect, by the classification monitor, a campaign of adversarial classification decision outputs in the machine learning model;
        apply a transformation function to the machine learning model in the model environment to transform the adversarial classification decision outputs to thwart the campaign of adversarial classification decision outputs;

determine a malicious attack on the computing device based in part on detecting the campaign of adversarial classification decision outputs; and implement a security action to protect the computing device against the malicious attack.

13. The system of claim 12, where the instructions are further executable to:

determine a cessation of the campaign of adversarial classification decision outputs; and restore the machine learning model in the model environment after the cessation.

14. The system of claim 12, wherein, when the processor monitors the classification decision outputs, the instructions are further executable to monitor a scalar score.

15. The system of claim 12, wherein, when the processor monitors the classification decision outputs, the instructions are further executable to:

determine that each of the classification decision outputs is either malicious or benign.

16. The system of claim 12, wherein, when the processor detects the campaign of adversarial classification decision outputs, the instructions are further executable to:

detect a plurality of adversarial inputs during runtime on the computing device that are intended to misclassify the classification decision outputs.

17. The system of claim 16, the instructions being further executable to:

evaluate a performance level of the machine learning model by analyzing a receiver operating characteristics curve (ROC).

18. The system of claim 17, the instructions being further executable to:

set an ROC threshold, the threshold associated with a pre-determined point on the ROC curve;

derive a binary difficulty detector from a distribution of naturally-occurring difficult samples;

sample from the distribution at different proportions of binary ground-truth labels;

proactively compute a low-bandwidth equiprobable posterior function from the sampling based on detecting the plurality of adversarial inputs during runtime; and deploy the low-bandwidth equiprobable posterior function based on each of a plurality of adversarial environments.

19. The system of claim 17, the instructions being further executable to:

detect a pinch-down on the ROC curve; and apply the transformation function in the model environment to transform the adversarial classification decision outputs based on detecting the pinch-down on the ROC curve.

20. One or more non-transitory computer-readable media comprising one or more computer readable instructions that, when executed by one or more processors of a computing device, cause the computing device to perform a method for machine learning adversarial campaign mitigation on a computing device, comprising:

deploying a machine learning model in a model environment associated with the computing device;

deploying a classification monitor in the model environment to monitor classification decision outputs in the machine learning model, wherein the deploying of the classification monitor in the model environment comprises deploying the classification monitor in a threat environment where greater than 95% of the classification decision outputs have an equal to or less than 0.1% false positive rate;

detecting, by the classification monitor, a campaign of adversarial classification decision outputs in the machine learning model;

applying a transformation function to the machine learning model in the model environment to transform the adversarial classification decision outputs to thwart the campaign of adversarial classification decision outputs;

determining a malicious attack on the computing device based in part on detecting the campaign of adversarial classification decision outputs; and implementing a security action to protect the computing device against the malicious attack.

* * * * *